United States Patent
Hoffman et al.

(10) Patent No.: US 10,697,301 B2
(45) Date of Patent: Jun. 30, 2020

(54) TURBINE ENGINE AIRFOIL HAVING A COOLING CIRCUIT

(71) Applicant: General Electric Company, Schenectady, NY (US)

(72) Inventors: James Michael Hoffman, Hamilton Township, OH (US); Weston Nolan Dooley, West Chester, OH (US); Matthew Lee Krumanaker, Blue Ash, OH (US); Aaron Ezekiel Smith, Montgomery, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 399 days.

(21) Appl. No.: 15/481,659

(22) Filed: Apr. 7, 2017

(65) Prior Publication Data
US 2018/0291743 A1   Oct. 11, 2018

(51) Int. Cl.
*F01D 5/08*      (2006.01)
*F01D 5/18*      (2006.01)

(52) U.S. Cl.
CPC ............ *F01D 5/081* (2013.01); *F01D 5/187* (2013.01); *F05D 2240/121* (2013.01); *F05D 2240/303* (2013.01); *F05D 2240/81* (2013.01); *F05D 2260/202* (2013.01); *F05D 2260/205* (2013.01); *F05D 2260/2212* (2013.01)

(58) Field of Classification Search
CPC .......... F01D 5/081; F01D 5/187; F01D 5/186; F05D 2260/205
USPC ...................................................... 416/96 R
See application file for complete search history.

(56) References Cited

U.S. PATENT DOCUMENTS

| | | | |
|---|---|---|---|
| 3,864,058 A | 2/1975 | Womack | |
| 4,416,585 A | 11/1983 | Abdel-Messeh | |
| 4,565,490 A * | 1/1986 | Rice ........................ | F01K 23/10 415/114 |
| 4,738,588 A * | 4/1988 | Field ....................... | F01D 5/186 415/115 |
| 4,786,233 A * | 11/1988 | Shizuya ................... | F01D 5/187 416/90 R |
| 4,835,958 A * | 6/1989 | Rice ........................ | F01D 5/185 415/114 |
| 5,296,308 A * | 3/1994 | Caccavale ................ | B22C 9/04 164/361 |
| 5,356,265 A | 10/1994 | Kercher | |
| 5,690,473 A * | 11/1997 | Kercher ................... | F01D 5/183 415/115 |

(Continued)

FOREIGN PATENT DOCUMENTS

| | | | | |
|---|---|---|---|---|
| CN | 105308267 A | 2/2016 | | |
| EP | 2853689 A1 * | 4/2015 | ............. | F01D 5/187 |

OTHER PUBLICATIONS

Chinese Patent Office, Office Action re Chinese Patent Application No. 201810304786.4, dated Jan. 19, 2020, 7 pages, China.

*Primary Examiner* — George C Jin
*Assistant Examiner* — Teuta B Holbrook
(74) *Attorney, Agent, or Firm* — McGarry Bair PC

(57) ABSTRACT

A turbine engine can include an airfoil comprising an outer wall bounding an interior, as well as an airfoil cooling circuit located within the interior and including a feed tube separating into at least first and second branches. A flow divider can be included in the airfoil and positioned to confront the feed tube.

30 Claims, 5 Drawing Sheets

(56) References Cited

U.S. PATENT DOCUMENTS

| | | |
|---|---|---|
| 5,931,638 A | 8/1999 | Krause et al. |
| 6,988,872 B2 | 1/2006 | Soechting et al. |
| 7,011,502 B2 | 3/2006 | Lee |
| 7,118,325 B2* | 10/2006 | Kvasnak ................. F01D 5/005 |
| | | 415/115 |
| 7,527,474 B1 | 5/2009 | Liang |
| 7,563,073 B1 | 7/2009 | Liang |
| 7,690,893 B2 | 4/2010 | Cunha |
| 7,731,481 B2 | 6/2010 | Cunha et al. |
| 8,152,467 B2* | 4/2012 | Guemmer ............... F01D 5/145 |
| | | 416/232 |
| 8,210,814 B2 | 7/2012 | Zausner et al. |
| 8,342,797 B2 | 1/2013 | Kwon et al. |
| 8,742,279 B2* | 6/2014 | Gannelli .................. B23H 1/04 |
| | | 219/69.1 |
| 8,764,394 B2 | 7/2014 | Lee et al. |
| 8,920,110 B2 | 12/2014 | Anguisola McFeat et al. |
| 9,080,451 B2 | 7/2015 | Simpson et al. |
| 9,945,233 B2 | 4/2018 | Tanaka et al. |
| 2005/0111977 A1 | 5/2005 | Lee et al. |
| 2005/0169752 A1 | 8/2005 | Lee et al. |
| 2005/0232769 A1 | 10/2005 | Lee et al. |
| 2009/0068021 A1* | 3/2009 | Liang ...................... F01D 5/187 |
| | | 416/97 R |
| 2011/0186550 A1* | 8/2011 | Gannelli .................. B23H 1/04 |
| | | 219/69.1 |
| 2012/0269615 A1* | 10/2012 | Kuwabara ............... F01D 5/186 |
| | | 415/116 |
| 2013/0175015 A1* | 7/2013 | Tanaka .................... F01D 5/186 |
| | | 165/168 |
| 2013/0209268 A1* | 8/2013 | Bregman ................ F01D 5/187 |
| | | 416/96 R |
| 2013/0216395 A1* | 8/2013 | Bregman ................ F01D 5/187 |
| | | 416/97 R |
| 2013/0294898 A1 | 11/2013 | Lee |
| 2014/0010666 A1* | 1/2014 | Hudson ................... F01D 5/186 |
| | | 416/97 R |
| 2014/0099189 A1* | 4/2014 | Morris .................... F01D 5/186 |
| | | 415/115 |
| 2014/0219813 A1* | 8/2014 | Perez ...................... F01D 5/188 |
| | | 416/96 R |
| 2015/0132147 A1* | 5/2015 | Scribner ................. F01D 5/188 |
| | | 416/96 R |
| 2015/0152738 A1* | 6/2015 | Liang ...................... F01D 5/188 |
| | | 60/806 |
| 2016/0230564 A1* | 8/2016 | Mongillo, Jr. .......... F01D 5/186 |
| 2016/0237833 A1 | 8/2016 | Tsypkaykin et al. |
| 2017/0175544 A1* | 6/2017 | Smith ..................... F01D 5/187 |
| 2017/0234140 A1* | 8/2017 | Bunker ................... F01D 5/187 |
| | | 415/208.1 |
| 2017/0328219 A1* | 11/2017 | Leary ...................... F01D 5/187 |
| 2018/0230815 A1* | 8/2018 | Jones ...................... F01D 5/187 |
| 2019/0078444 A1* | 3/2019 | Jang ........................ F01D 5/187 |

\* cited by examiner

TURBINE ENGINE AIRFOIL HAVING A COOLING CIRCUIT

BACKGROUND OF THE INVENTION

Turbine engines, and particularly gas or combustion turbine engines, are rotary engines that extract energy from a flow of pressurized combusted gases passing through the engine onto a multitude of rotating turbine blades.

Gas turbine engines for aircraft are designed to operate at high temperatures to maximize engine efficiency, so cooling of certain engine components, such as those in the turbine section, can be beneficial.

BRIEF DESCRIPTION OF THE INVENTION

In one aspect, an airfoil for a turbine engine comprises an outer wall bounding an interior and defining a pressure side and a suction side extending between a leading edge to a trailing edge to define a chord-wise direction and extending between a root and a tip to define a span-wise direction, an airfoil cooling circuit located within the interior and having a feed tube separating into at least first and second branches at a turn adjacent one of the root or tip, and a flow divider forming part of the turn and confronting the feed tube and dividing the feed tube between the first and second branches.

In another aspect, a component for a turbine engine comprises a wall bounding an interior, a cooling circuit located within the interior and having a feed tube separating into at least first and second branches at a turn, and a flow divider forming part of the turn and confronting the feed tube and dividing the feed tube between the first and second branches.

In yet another aspect, a method of cooling an airfoil comprising supplying cooling air from a feed tube to a turn within the airfoil and branching the cooling air at the turn into at least two cooling branches by flowing the cooling air onto a flow divider at the turn to divide cooling air between the at least two cooling branches.

DESCRIPTION OF EMBODIMENTS OF THE INVENTION

Figure 1:
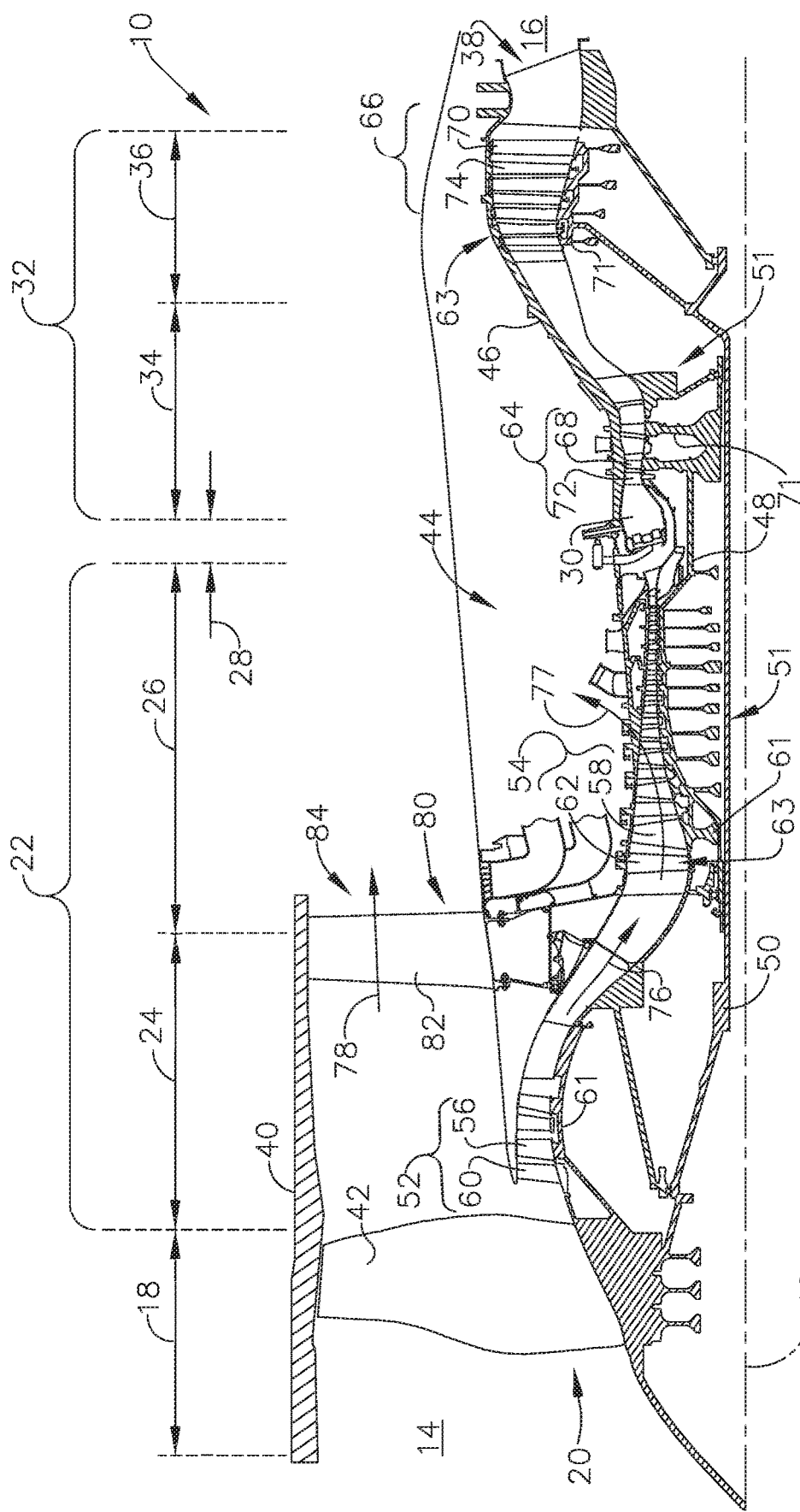
FIG. 1 is a schematic cross-sectional diagram of a turbine engine for an aircraft including an airfoil according to various aspects described herein.

The described embodiments of the present disclosure are directed to a cooling circuit for an airfoil. For purposes of illustration, the present disclosure will be described with respect to the turbine for an aircraft turbine engine. It will be understood, however, that the disclosure is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
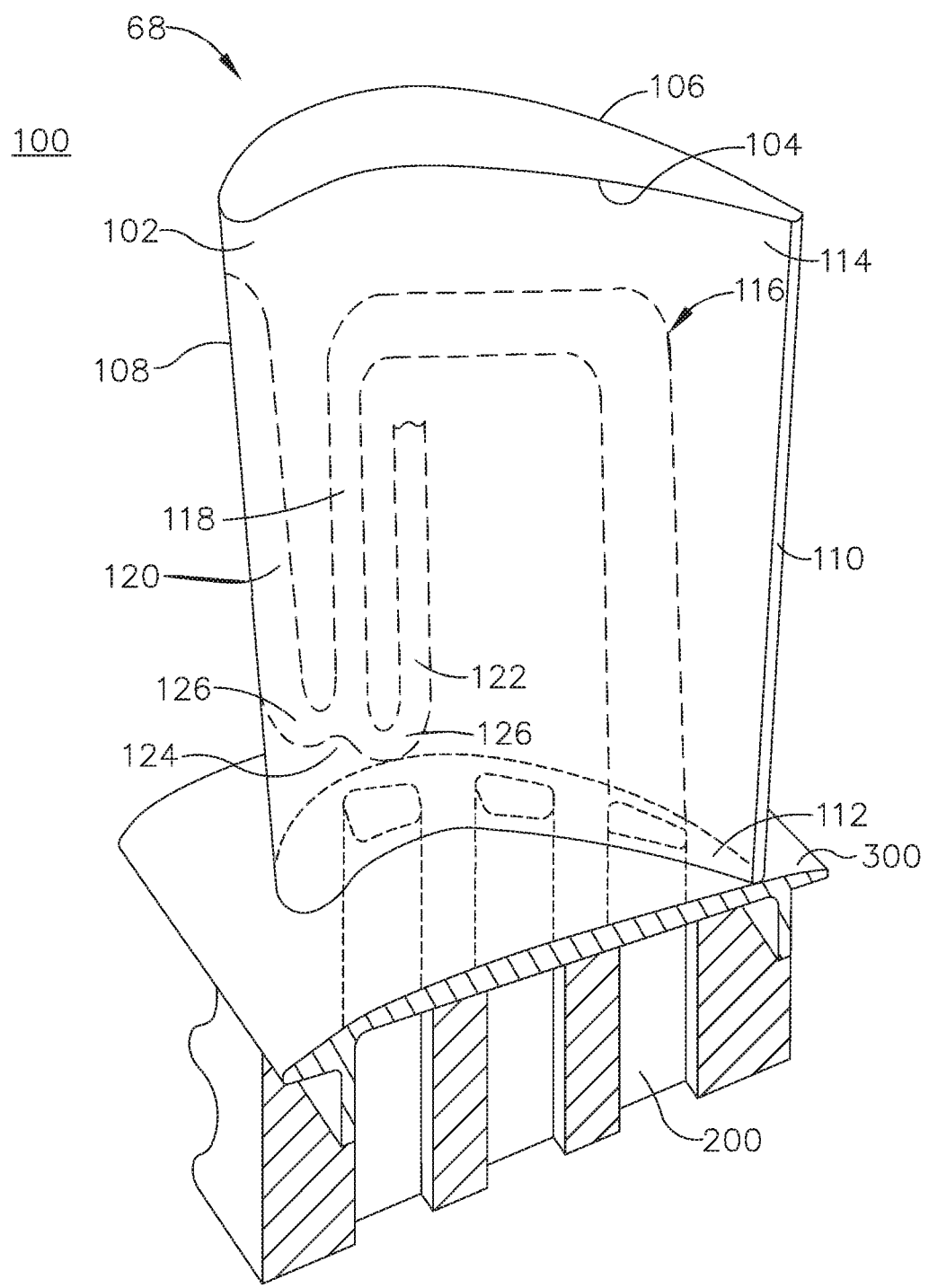
FIG. 2 is a perspective view of the airfoil of FIG. 1 including a cooling circuit.

Turning to FIG. 2, a component 100 of the engine 10, illustrated as an airfoil such as the HP turbine blade 68 can comprise an outer wall 102 that bounds an interior and includes a pressure side 104 and a suction side 106. The turbine blade 68 can extend from a root 112 to a tip 114 and include a leading edge 108 and trailing edge 110 as shown.

The HP turbine blade 68 can also include an interior airfoil cooling circuit 116 comprising a feed tube 118 that can separate into a first branch 120 and second branch 122 near the leading edge 108; it should be understood that the branches 120, 122 and feed tube 118 can also be provided near the trailing edge 110, or anywhere within the interior of the blade 68 as desired. The feed tube 118 is illustrated in fluid connection with a channel 200 in a platform 300 supporting the blade 68, and it should be understood that any desired cooling channel or branch can be used to supply the feed tube 118. In addition, a flow divider 124 can be provided confronting the feed tube 118 to form part of a turn 126 into the branches 120, 122 adjacent the root 112, and it is also contemplated that the flow divider 124 can be provided for turns 126 adjacent the tip 114 of the blade 68 as well.

Figure 3A:
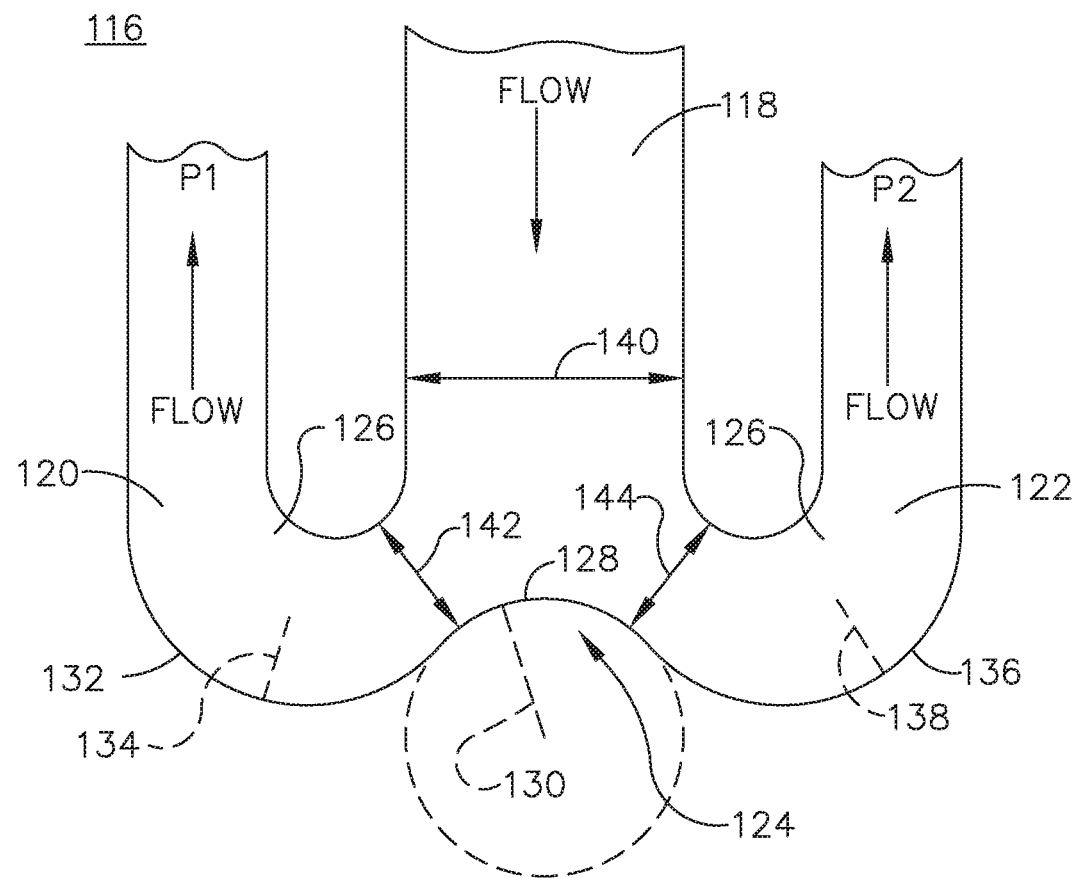
FIG. 3A-FIG. 3B are variations of schematic diagrams illustrating a portion of the cooling circuit of FIG. 2.
Figure 3B:
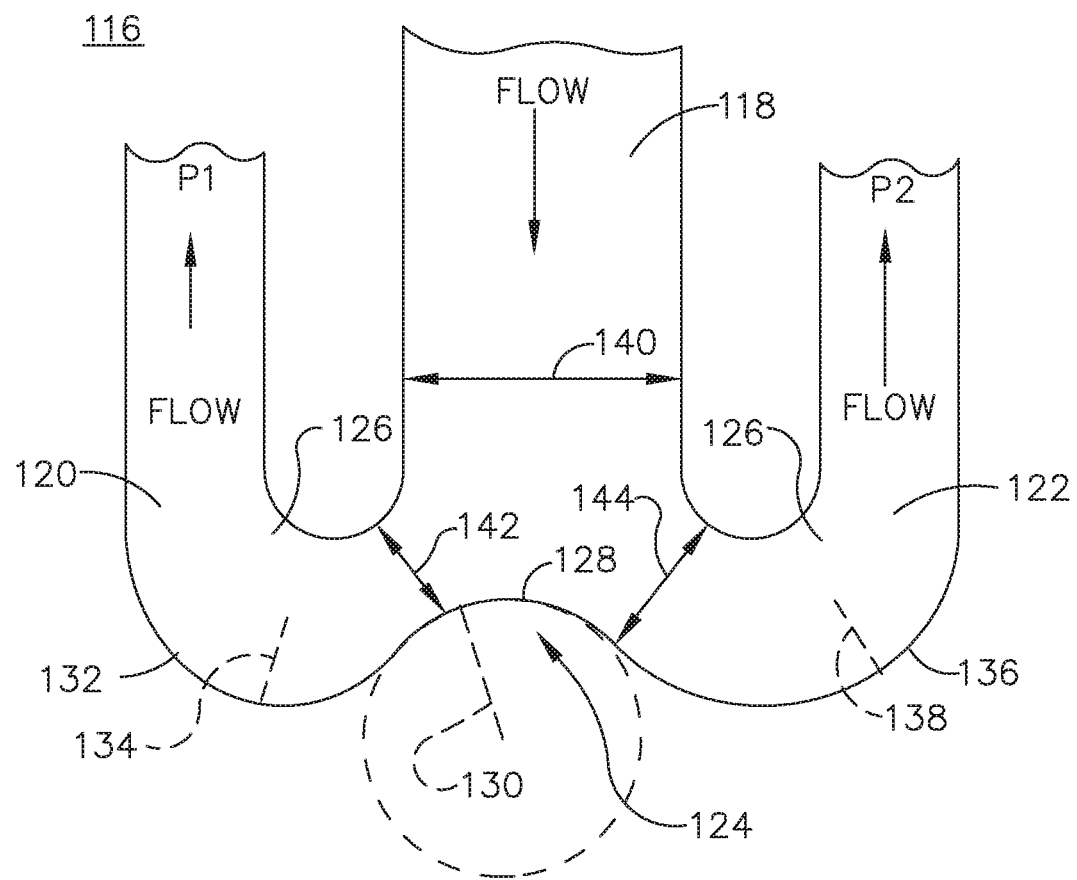

The airfoil cooling circuit 116 is illustrated in further detail in FIG. 3A and FIG. 3B, viewed from the leading edge 108. The flow divider 124 can comprise an apex 128 having an apex radius of curvature 130, a first valley 132 having a first radius of curvature, and a second valley 136 having a second radius of curvature 138 as shown. The first and second valleys 132, 136 can form a portion of the turns 126 into the first and second branches 120, 122, respectively. In non-limiting examples, the apex radius of curvature 130 can be between 0.0 and 0.2 inches, the first radius of curvature 134 can be between 0.1 and 0.3 inches, and the second radius of curvature 138 can be between 0.1 and 0.3 inches.

The first and second valleys 132, 136 are illustrated having circular profiles with equal radii of curvatures 134, 138. It is contemplated that the first radius of curvature 134 can differ from the second radius of curvature 138, and further, that the first and second valleys 132, 136 can have any profile shape including noncircular or irregular profiles. In addition, the apex radius of curvature 130 can be sufficiently small so as to create a pointed apex profile as desired. The apex radius of curvature 130 can also be a function of at least one of the first and second radii of curvature 134, 138; in a non-limiting example, the apex radius of curvature 130 can be smaller than either or both of the first and second radii of curvature 134, 138. Further, while the apex 128 is illustrated as positioned halfway between the first and second branches 120, 122, it is contemplated that the apex 128 can be positioned in an asymmetric manner closer to the first branch 120 or second branch 122 as desired.

The feed tube 118 in the airfoil cooling circuit 116 can include a feed cross-sectional area 140, the first branch 120 can include a first cross-sectional area 142, and the second branch 122 can include a second cross-sectional area 144 as shown. The first and second branches 120, 122 are illustrated having equal cross-sectional areas 142, 144; it is also contemplated that the first cross-sectional area 142 can differ from the second cross-sectional area 144, and further, that the feed cross-sectional area 140 can be a function of at least one of the first and second cross-sectional areas 142, 144; in a non-limiting example the feed cross-sectional area 140 can be at least as large as the sum of the first and second cross-sectional areas 142, 144. It can be appreciated that the first and second cross-sectional areas 142, 144 can be determined at least by the chosen position of the apex 128 between the first and second branches 120, 122.

Figure 4:
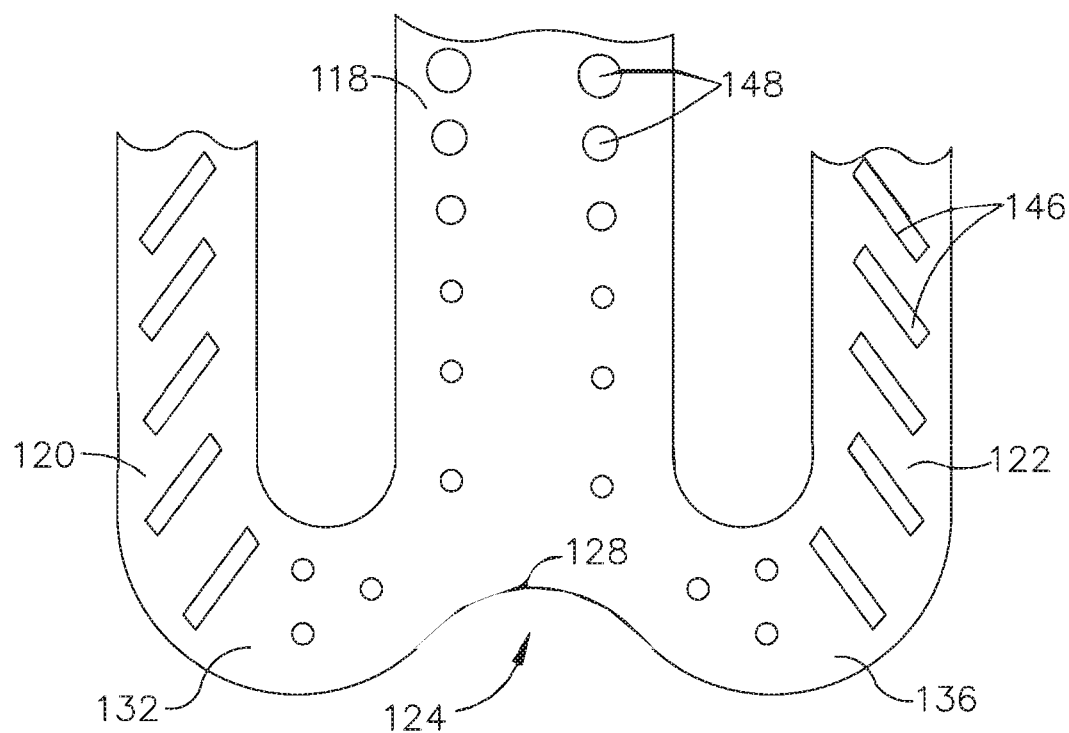
FIG. 4 is a schematic diagram of the cooling circuit of FIG. 3A including flow enhancers.

Turning to FIG. 4, the airfoil cooling circuit 116 (as viewed from the leading edge 108) can further include at least one flow enhancer, illustrated as a turbulator 146 or pin bank 148 in non-limiting examples, provided in any or all of the feed tube 118, first branch 120, second branch 122, or valleys 132, 136 of the cooling circuit 116 as shown. Combinations of turbulators 146 and pin banks 148 may also be utilized for the flow enhancers.

In operation, cooling air (illustrated as arrows in FIGS. 3 and 4) can flow through the feed tube 118 onto the flow divider 124, branch at the turns 126 to flow along the first and second valleys 132, 136, and flow into the first and second branches 120, 122 to cool the blade 68. The flow from the feed tube 118 can be evenly or unevenly divided between the branches 120, 122 based at least on the chosen position or profile of the flow divider 124 or the size of the first and second cross-sectional areas 142, 144.

It can be appreciated that selection of appropriate first and second cross-sectional areas 142, 144 (FIG. 3A or FIG. 3B) can be utilized to provide desired amounts of cooling air into the first and second branches 120, 122; changing a given cross-sectional area can provide cooling air having a particular sink pressure (shown in FIG. 3A or FIG. 3B as P1 and P2) to account for a possible difference in ambient pressures between the branches 120, 122. It can also be appreciated that aspects described in the present disclosure can be used for any number of branches from the feed tube 118 and that the flow divider 124 can have a three-dimensional dividing profile, such as conical, mounded, or peaked in non-limiting examples, to provide cooling air to selected regions within the blade 68. In addition, the use of flow enhancers such as the turbulators 146 or pin banks 148 can augment the cooling effect of the blade 68 by the cooling air supplied by the feed tube 118.

It should be understood that application of the disclosed design is not limited to turbine engines with fan and booster sections, but is applicable to turbojets and turboshaft engines as well. In addition, while the component 100 is illustrated herein as the HP turbine blade 68, it will be understood that the disclosed design is contemplated for use with any stationary or non-stationary airfoil, such as the HP or LP compressor blades 56, 58, HP or LP compressor vanes 60, 62, LP turbine blades 70, HP or LP turbine vanes 72, 74, or any other component 100 within the engine 10 desired for cooling.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine comprising:
   an outer wall bounding an interior and defining a pressure side and a suction side extending between a leading edge to a trailing edge to define a chord-wise direction and extending between a root and a tip to define a span-wise direction;
   an airfoil cooling circuit located within the interior and having a feed tube extending in a span-wise direction and separating into at least first and second branches at a turn adjacent one of the root or tip, with at least one of die first and second branches extending in a span-wise direction, and wherein the feed tube is disposed between the first and second branches; and,
   a flow divider forming part of the turn and confronting the feed tube and dividing the feed tube between the first and second branches.

2. The airfoil of claim 1 wherein the flow divider in cross section defines an apex having an apex radius of curvature.

3. The airfoil of claim 2 wherein the apex radius of curvature is between 0.0 and 0.2 inches.

4. The airfoil of claim 2 wherein the flow divider comprises a first valley having a first radius of curvature, with the first valley forming a portion of the turn into the first branch.

5. The airfoil of claim 4 wherein the first radius of curvature is between 0.1 and 0.3 inches.

6. The airfoil of claim 4 wherein the first radius of curvature is greater than the apex radius of curvature.

7. The airfoil of claim 4 wherein the flow divider comprises a second valley having a second radius of curvature, with the second valley forming a portion of the turn into the second branch.

8. The airfoil of claim 7 wherein the second radius of curvature is between 0.1 and 0.3 inches.

9. The airfoil of claim 8 wherein the second radius of curvature is equal to the first radius of curvature.

10. The airfoil of claim 1 wherein the flow divider evenly divides fluid from the feed tube between the first and second branches.

11. The airfoil of claim 1 wherein the flow divider unevenly divides the fluid from the feed tube between the first and second branches.

12. The airfoil of claim 1 wherein the sum of cross-sectional areas of the first and second branches is at least equal to a cross-sectional area of the feed tube.

13. The airfoil of claim 1 further comprising at least one flow enhancer located within at least one of the first and second branches.

14. The airfoil of claim 13 wherein the flow enhancer comprises at least one of a turbulator or a pin bank.

15. The airfoil of claim 14 further comprising a flow enhancer within the feed tube.

16. A component for a turbine engine comprising:
    a wall bounding an interior;
    a cooling circuit located within the interior and having a feed tube extending in a span-wise direction and separating into at least first and second branches at a turn, with at least one of the first and second branches extending in a span-wise direction, and wherein the feed tube is disposed between the first and second branches; and,
    a flow divider forming part of the turn and confronting the feed tube and dividing the feed tube between the first and second branches.

17. The component of claim 16 wherein the flow divider in cross section defines an apex having an apex radius of curvature.

18. The component of claim 17 wherein the flow divider comprises a first valley having a first radius of curvature, with the first valley forming a portion of the turn into the first branch.

19. The component of claim 18 wherein the flow divider comprises a second valley having a second radius of curvature, with the second valley forming a portion of the turn into the second branch.

20. The component of claim 19 wherein at least one of the first and second radius of curvature is greater than the apex radius of curvature.

21. The component of claim 19 wherein the second radius of curvature is equal to the first radius of curvature.

22. The component of claim 16 wherein the flow divider evenly divides fluid from the feed tube between the first and second branches.

23. The component of claim 16 wherein the flow divider unevenly divides the fluid from the feed tube between the first and second branches.

24. The component of claim 16 wherein the sum of cross-sectional areas of the first and second branches is at least equal to a cross-sectional area of the feed tube.

25. The component of claim 16 further comprising at least one flow enhancer located within at least one of the first and second branches.

26. The component of claim 25 further comprising a flow enhancer within the feed tube.

27. The component of claim 26 wherein the flow enhancer comprises at least one of turbulators or a pin bank.

28. A method of cooling an airfoil comprising supplying cooling air from a feed tube extending in a span-wise direction to a turn within the airfoil and branching the cooling air at the turn into at least two cooling branches by flowing the cooling air onto a flow divider at the turn to divide cooling air between the at least two cooling branches, where at least one of the first and second branches extends in a span-wise direction, and wherein the feed tube is disposed between the at least two cooling branches.

29. The method of claim 28 wherein the flowing the cooling air onto the flow divider comprises flowing the cooling air into an apex of the flow divider.

30. The method of claim 29 wherein flowing the cooling air onto the divider comprises flowing the cooling air along a curved surface downstream of the apex to effect a turning of the cooling air.

* * * * *